United States Patent [19]

Stepan

[11] 4,027,557

[45] June 7, 1977

[54] STRIPPING DEVICE FOR WIRE, OR THE LIKE

[75] Inventor: Jiri Stepan, Stafa, Switzerland

[73] Assignee: K. Loepfe Automation AG, Hombrechtikon, Switzerland

[22] Filed: Sept. 2, 1976

[21] Appl. No.: 720,092

[30] Foreign Application Priority Data

Apr. 26, 1976 Switzerland .................. 5196/76

[52] U.S. Cl. .................. 81/9.5 R; 30/90.1
[51] Int. Cl.² ......................... H02G 1/12
[58] Field of Search ............ 81/9.5 R, 9.5 A; 30/90.1, 276

[56] References Cited

UNITED STATES PATENTS 3,614,905  10/1971  Bieganski ............... 81/9.5 R

FOREIGN PATENTS OR APPLICATIONS 1,515,503  7/1969  Germany ................ 81/9.5 R
2,313,125  9/1974  Germany ................ 81/9.5 R
567,820  10/1975  Switzerland ............ 81/9.5 R

*Primary Examiner*—James L. Jones, Jr.
*Assistant Examiner*—James G. Smith
*Attorney, Agent, or Firm*—Ostrolenk Faber Gerb & Soffen

[57] ABSTRACT

A stripping device for wire, or the like: a spindle is freely rotatably mounted inside a housing; appropriate threaded connections between the spindle and the interior of the housing cause the spindle to rotate axially when the spindle is pulled; an insulating cutting knife is operatively connected with the spindle to rotate therewith; a passage leads past the cutting edge of the knife; the knife is pivotable out of the passage to permit the wire to be inserted into the passage and then the knife returns to the cutting position after insertion of the wire; pulling upon the wire pulls the spindle, causes the spindle to spin and rotates the knife around the insulation layer.

13 Claims, 3 Drawing Figures

STRIPPING DEVICE FOR WIRE, OR THE LIKE

BACKGROUND OF THE INVENTION

The present invention relates to a stripping device for stripping insulation from wire, or for the like stripping uses. The stripping device according to the present invention uses a rotatably mounted knife.

Conventional stripping devices, which are typically driven by an electric motor, are so heavy that they cannot be carried by an electrician to the site where they are needed. As a result, the electrician must use previously stripped wires or he must manually strip wires at the site using specially designed pliers. Stripping of wires at the site of use may be difficult, depending upon the space available for this operation and the visibility conditions (which would be limited in darkness, closed areas, etc.). There is also a risk, particularly where stranded cable is being stripped, that the wire or the individual strands of the wire will be damaged during the stripping.

An easily portable stripping device, which can be carried around by an electrician and which is ready for use anytime is required.

Portable stripping devices are known wherein the cutting knife is rotated around the wire insulation to trim the insulation and wherein the spindle of the stripping device is rotatable to rotate the knife. But, none of these known arrangements enables easy stripping, for example, simply by pulling the wire to be stripped out of the stripping device.

SUMMARY OF THE INVENTION

The stripping device according to the present invention comprises a housing having a spindle rotatably mounted therein. A head is carried at the end of the spindle outside the housing. The head accommodates the insulation cutting knife. The head is also provided with guiding means for guiding the end of the wire to be stripped to its proper position with respect to the knife. Appropriate connection means are provided between the spindle and the housing such that when the inserted wire is pulled in the direction to remove it from the head, the spindle is spun by the pulling force and the knife trims the insulation.

It is the primary object of the present invention to provide an effective stripping device for insulation on wire, or for the like stripping purposes.

It is another object of the invention to provide such a stripping device which is portable and can be used on the site.

It is another object of the invention to provide a simplfied, light-weight stripping device.

It is a further object of the invention to simplify the rotation of the knife which trims the insulation, or the like, being stripped.

BRIEF DESCRIPTION OF THE DRAWINGS

One embodiment of a stripping device according to the invention is described with reference to the accompanying drawings.

Figure 1:
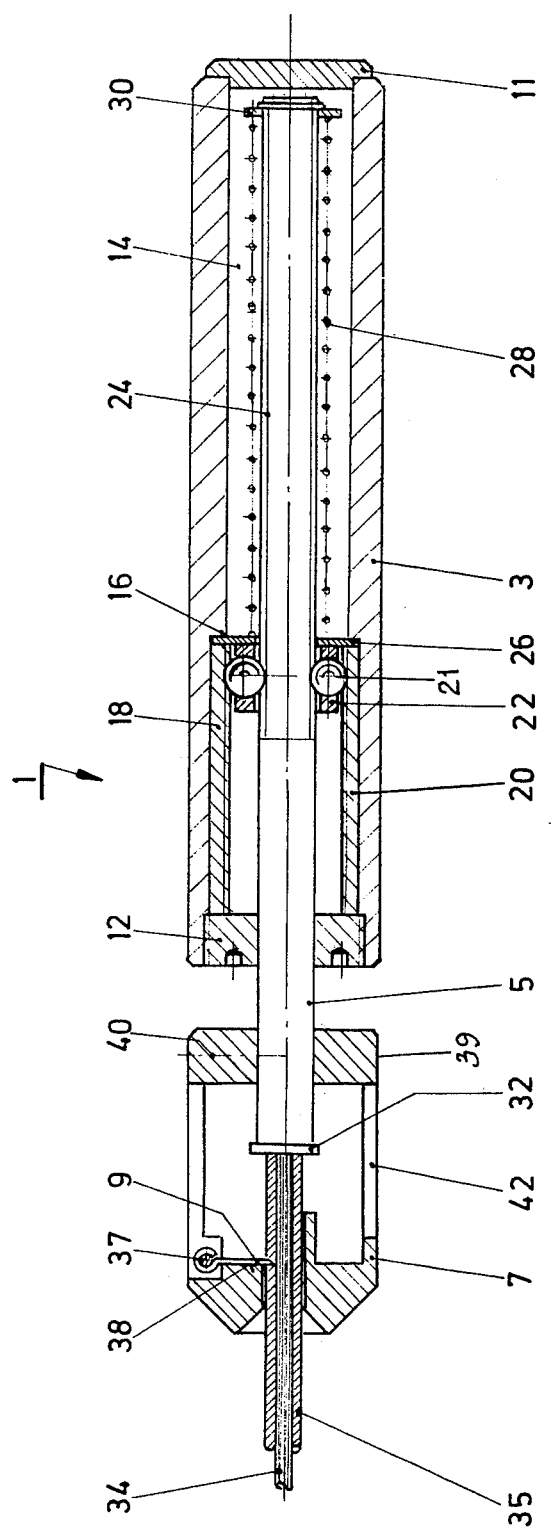
FIG. 1 is a longitudinal cross-sectional view through a stripping device according to the invention.

DETAILED DESCRIPTION OF A PREFERRED EMBODIMENT:

The drawings show a stripping device 1 for wire, or the like, which device is operated by hand. The device includes a hollow cylindrical housing 3, which serves as a handle for the stripping device. One end of the housing 3 is closed by a bottom cover 11. The other end of the housing is closed by threaded housing cover 12. The housing has a hollow bore 14 therethrough in which the below described spindle 5 is positioned. The housing bore is counterbored part way along its length, which makes the section of the bore 14 that is nearer to the cover 12 have a wider diameter than the other section. Between the sections of bore 14 a shoulder 16, which faces toward the cover 12, is defined.

A hollow guide bushing 18, having an outer diameter approximating the internal diameter of the wider section of bore 14, is inserted in the bore. The guide bushing 18 is closed off at one end by a retaining ring 26 located at and resting against shoulder 16. The bushing 18 is closed at the other end by the threaded cover 12. The interior wall of bushing 18 is provided with a helically threaded groove 20. The threaded groove 20 is engaged by the ball bearings 21 of the ball bearing bushings 22. As described below, rotation of spindle 5 rotates the ball bearings 21 through the helical groove in the bushing 12.

A spindle 5 is mounted in the housing bore 14. The free end of spindle 5 projects out of bore 14 and it supports a head 7, which is provided with one or more knives 9. Over at least part of its length, the exterior of spindle 5 is provided with an external helical groove 24 that is also engaged by the ball bearings or the ball bearing bushing 22 at the radially interior side of the bushing 22. The pitch of the helical groove 24 differs from the pitch of the helical groove 20 in order to preclude the ball bearing bushing 22 simply spinning around the grooves 20, 24 without the ball bearing bushing 22 cooperating in the rotation of the spindle 5. As described below, because the pitches of the two helical grooves differ slightly, the spindle 5 is caused to rotate.

The retaining ring 26 inside bore 14 serves as one seat for a helical compression spring 28. A second seat 30 for the spring 28 is located at the end of spindle 5 inside bore 14. Spring 28 normally urges spindle 5 into bore 14 toward cover 11.

The opposite free end of spindle 5 is the seating surface 32 for the wire end that is to be stripped. At the free end of spindle 5, a head 7 is supported. The head has a relatively wide internal diameter and has a large hollow space within. The head includes a rearward sleeve 39 which seats upon the spindle 5 and holds the head 7 in the illustrated orientation with respect to the spindle. Head 7 may be shifted longitudinally along the spindle 5 to adjust the length of the portion of a wire 34 that is to be stripped of installation 35. The pin 40 of a set screw (not shown) adjustably affixes the head 7 along the spindle 5, thereby to vary the length of the end portion of the insulated wire 34 that is to be stripped.

There is a knife 9 inside the head 7. Its sharpened cutting edge 62 of the knife is so shaped and placed that it will engage and cut the insulation 35 on one side of the wire 34 that is emplaced in the head 7, as described below. The knife 9 is pivotable about a pivot pin 37 that is supported in the body of the head 7. Knife 9 is pivotable between the operative position illustrated in the drawings and a position wherein the knife blade is tilted to slant inwardly toward the rear of the head 7. A forward knife stop 38 in head 7 defines the forward limit of the pivoting range of knife 9. The head 7 is further provided with a plurality of sight windows 42, which permit observation and reduce the weight of the head.

Figure 3:
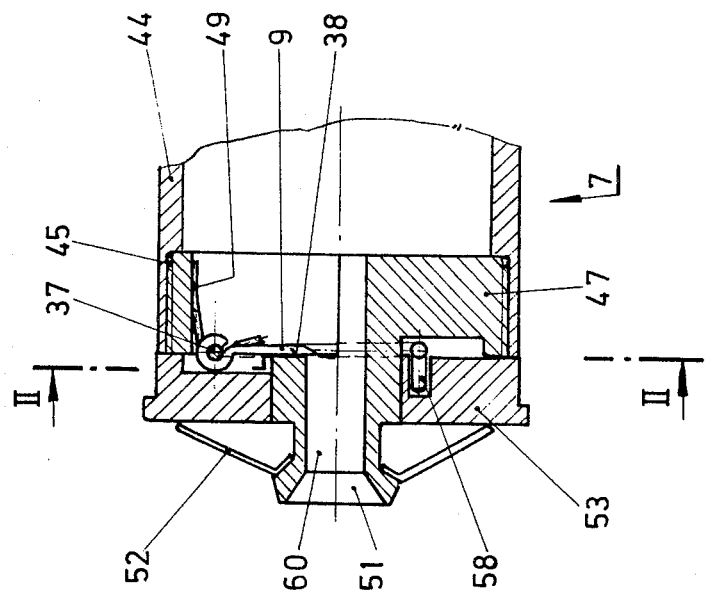
FIG. 3 is an enlarged fragmentary view of a portion of the head of the stripping device of FIG. 1.
Figure 2:
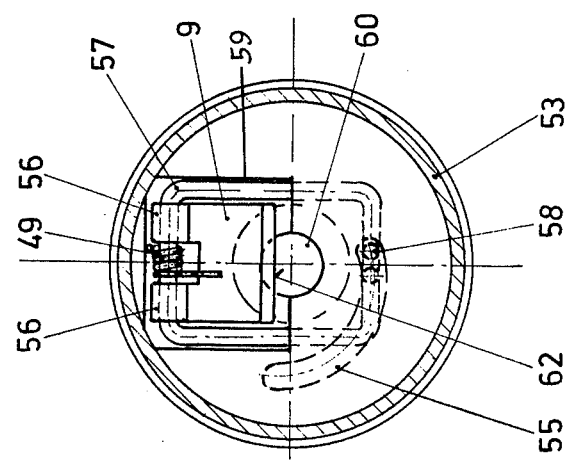
FIG. 2 is a cross-sectional view along the line II—II of FIG. 3, showing the head of the stripping device.

Referring to FIG. 3, the head 7 includes an annular jacket 44. One end of the jacket is internally threaded at 45. The thread 45 receives the knife holder 47, in which the knife 9 is located. There is a torsion spring 49 in the holder 47, which constantly biases the knife 9 toward the stop 38.

At the outer forward side of head 7, the knife holder 47 supports a wire insertion guide, which is a tapered passage 51 that eases the introduction of the wire to be stripped into the wire receiving passage 60. The taper of passage 51 is provided with a graduated ring.

A knife adjustment ring 53 with a marker (not shown) for the graduated ring 52 is pushed over the guide taper 51. The ring 53 is provided with a short total length, curved adjusting slot 55. From one end of slot 55 to the other, the slot moves gradually radially outwardly. There is a knife holder frame 57, which is pivotally mounted in a double bearing 56 in the knife holder 47. Holder frame 57 includes an arm that extends away from the bearing 56. There is a guide cam 58 on the knife holder frame 57. The cam 58 is received in the adjustment slot 55 of the ring 53 when the head is assembled. Rotation of ring 53 around the wire receiving passage 60 will, through the engagement of cam 58 in slot 55 shift the frame radially through the guide chamber 59 provided for the frame 57 in the holder 47.

The above-described stripping device is operated as follows:

Typically, a wire to be stripped is comprised of wire strands 34 which are enclosed by insulating material 35 that is to be removed from the wire strands.

According to the length of the end portion of the wire 34 to be stripped, the head is fixed on the spindle 5 by means of the set screw pin 40. This fixes the position of the seating surface 32 inside the hollow of the head 7. It also adjusts the distance between the seating surface 32 and the knife 9. Appropriate rotation of the knife adjustment ring 53 positions a mark of the graduated ring 52 at the desired point corresponding to a particular wire thickness so that the knife 9, 62 will properly engage a wire in passage 60 without damaging any strands of the wire while properly cutting the insulation.

The end of the wire to be stripped is introduced into the guide taper 51 and is pushed through the wire passage 60 until the end of the wire strikes the seating surface 32 of the spindle. As the wire is being inserted, the end of the wire engages the knife 9 in the area of the cutting edge 62 and it pivots the knife 9 about the pivot pin 37 until the cutting edge 62 rests against the surface of the insulation 35. Knife edge 62 continues to rest upon the insulation as the wire is pushed further. When the end of the wire strikes the seating surface 32 and the wire cannot be moved further, the device is now ready to commence the stripping operation.

The housing 3 is held in one hand and the wire is pulled in the direction out of the head 7 with the other hand. Due to the pulling upon the wire 34, the continuously spring biased cutting edge 62 cuts into the insulation 35 and the knife 9 pivots back to the position shown in FIG. 1 against the stop 38. The knife has then cut through the insulation properly. Because the insulation layer 35 offers resistance to the cutting action due to the insulation 35 being flush with the cutting edge 62, the head 7 necessarily is pulled along with the wire 34, 35. Because the spindle 5 is connected to the head 7 by the pin 40, the spindle 5 is also pulled out of the housing 3 by the pulling upon the wire 34.

Because of the ball bearing bushing 21, 22 which mounts the spindle 5 in the housing 3, as the spindle is pulled out of the housing 3, it is caused to rotate in the housing 3, corresponding to the pitch of the helical thread 24, as a result of the ball bearings 21 of the ball bearing bushing 22 engaging in the helical slot 24. At the same time, the ball bearing bushing is being carried along with the spindle by this rotary motion in accordance with the engagement of the ball bearings 21 in the helical groove 20 and in accordance with the pitch of the helical groove 20. This rotational movement reduces the friction of the spindle 5 in the housing 3 to a minimum. Thus, the device provides means for causing the spindle 5 to rotate as the spindle is drawn out of the housing 3.

As the spindle 5 rotates, it in turn rotates the head 7 and also rotates the knife 9 around the wire 34. The wire 34 is not held to the head 7 except by the knife 9, 62. Hence, the rotation of the head 7 occurs with respect to the wire 34 and the rotation causes the knife cutting edge 62 to cut through the insulation 35 completely around the wire 34. Thus, rotation of the cutting edge around the entire insulating material jacket is achieved. The insulating material is cut through cleanly and effortlessly.

The cut-off portion of the insulating material is held back in the head 7 by the cutting edge 62 when the stripped wire is pulled out of the head. In a further development of the invention, as the wire is pulled out of the head 7 with the wire end now stripped, the wire strands 34 may be retained by radially inwardly biased spring retaining means located in the knife holder 47, so that while the wire is being drawn out, an additional twisting of the strands is accomplished.

It is possible to calibrate the graduated ring 52 directly to standard sizes for insulated wires. It is also possible to apply markings for the length of the insulation to be stripped upon the spindle 5, so that the adjustments of the head 7 with respect to the spindle 5 can be easily accomplished.

After completion of the wire stripping operation, the spindle 5 and the head 7 secured thereto, are returned to their initial position by the force exerted by compression spring 28. As spindle 5 returns, it rotates in the opposite direction, due to the bushing 22 cooperating with the helical grooves of the bushing 18 and on the exterior of the spindle 5.

In a further alternative arrangement, it is possible to operate the foregoing device without having to pull on the wire. This would be accomplished by inserting within the housing 3 or associating therewith a cylindrical battery and a fractional horse power motor. The drive shaft of the motor would be elongated so that the shaft would serve as the spindle 5. By means of a switch for the motor, the motor would be activated after introduction into the head 7 of the wire end to be stripped. The motor would be deactivated almost immediately, without operating speed having been attained, because the rotating knife would have already cut the insulation in only a single rotation.

The stripping device described above is quite simple in design, is convenient to handle and is lightweight. It permits foolproof stripping of insulation from wires speedily and without requiring observation of the stripping process. Therefore, an electrician can carry the device with him to the site where it is needed.

Although there has been described a preferred embodiment of this novel invention, many variations and modifications will now be apparent to those skilled in the art. Therefore, this invention is to be limited not by the specific disclosure herein but only by the appending claims.

I claim:
1. A stripping device for stripping insulating from wire, or the like purposes, said device comprising:
   a spindle housing; a spindle rotatable in and longitudinally movable through said housing;
   a stripping head secured to said spindle for moving therewith; a passage into said head for receiving the wire, or the like, to be stripped;
   a knife in said head positionable to intersect said passage, thereby to engage and cut any object in said passage;
   spindle support means in said housing for causing rotation of said spindle as it is moved longitudinally of said housing, thereby to rotate said spindle and said knife with respect to the wire, or the like, being stripped.

2. The stripping device of claim 1, wherein said spindle has an exterior and said housing has an interior spaced from said spindle exterior;
   said spindle support means comprises a ball bearing bushing interposed between said spindle exterior and said housing interior.

3. The stripping device of claim 2, further comprising said housing interior having a first helical guide groove formed therein and said spindle exterior having a second helical guide groove formed thereon;
   said ball bearing bushing including ball bearings which engage in both said helical guide grooves, whereby as said spindle shifts longitudinally with respect to said housing, said ball bearing bushing causes rotation of said spindle with respect to said housing.

4. The stripping device of claim 3, wherein said helical guide grooves are at different respective pitches.

5. The stripping device of claim 3, further comprising a spring attached between said housing and said spindle to return said spindle after it has moved with respect to said housing.

6. The stripping device of claim 1, wherein said spindle has an end located in said head; said passage having an entrance and said passage extending from said entrance to said spindle end; the position of said head on said spindle being adjustable along said spindle, thereby adjusting the length of said passage from said entrance to said spindle end.

7. The stripping device of claim 1, further comprising a pivot mount in said head for said knife, and said knife being pivotally mounted on its said pivot mount to pivot selectively from extending partially across said passage to being raised out of said passage.

8. The stripping device of claim 7, wherein said knife is pivotable away from said entrance, which raises said knife out of said passage as a wire enters said passage entrance.

9. The stripping device of claim 8, further comprising biasing means normally biasing said knife to pivot toward said entrance.

10. The stripping device of claim 9, further comprising a stop in said head positioned to engage said knife and to hold said knife at its closest position to said passage entrance and partially across said passage.

11. The stripping device of claim 1, further comprising knife positioning means for adjusting the position of said knife with respect to said passage for controlling the extent to which said knife extends into and across said passage.

12. The stripping device of claim 11, wherein said knife is supported on a frame in said head and said knife frame is movable toward and away from said passage, thereby adjusting the distance which said knife extends into and across said passage.

13. The stripping device of claim 12, further comprising a rotatable knife position adjustment means in said head and having a curved adjustment slot that is shaped to gradually move radially outwardly of said head along the curvature of said adjustment slot; said knife frame having a cam secured thereto and in engagement with said adjustment slot, whereby rotation of said knife position adjustment means and of its said slot with respect to said knife frame cam adjusts the position of said knife toward and away from said passage.

* * * * *